United States Patent Office 3,767,706
Patented Oct. 23, 1973

3,767,706
HYDRATION OF ALIPHATIC NITRILES TO AMIDES USING COPPER METAL CATALYSTS
Clarence E. Habermann and Ben A. Tefertiller, Midland, Mich., assignors to The Dow Chemical Company, Midland, Mich.
No Drawing. Continuation-in-part of application Ser. No. 835,765, June 23, 1969, now Patent No. 3,631,104, which is a continuation-in-part of application Ser. No. 791,807, Jan. 16, 1969, now Patent No. 3,597,481. This application Sept. 2, 1971, Ser. No. 177,430
The portion of the term of the patent subsequent to Dec. 28, 1988, has been disclaimed
Int. Cl. C07c 103/08
U.S. Cl. 260—561 N          9 Claims

ABSTRACT OF THE DISCLOSURE

Aliphatic nitriles are converted to the corresponding amides by contacting the nitrile in the presence of water with a cupreous catalyst containing copper metal.

CROSS-REFERENCE TO RELATED APPLICATIONS

The present application is a continuation-in-part of our application Ser. No. 835,765, filed June 23, 1969, now Pat. No. 3,631,104, which in turn is a continuation-in-part of application Ser. No. 791,807, filed Jan. 16, 1969, now Pat. No. 3,597,481.

In our prior application, we reported the discovery that copper metal in the proper form is a very effective catalyst for the conversion of nitriles to amides. In discussing the copper catalyst, we stated:

The copper catalyst of the invention may be any conventional form of copper. Such copper metal catalysts may be purchased commercially or prepared by a number of known methods. Suitably such copper catalysts may be prepared by reducing copper oxide, by decomposing and reducing copper salts, such as, copper acetate, copper carbonate, copper hydroxide and copper oxalate or by reducing other copper salts, such as, copper halide, copper nitrate and copper sulfate. Copper catalysts prepared by reducing copper oxide are preferred.

BACKGROUND OF THE INVENTION

Hydration of nitriles in the presence of water has been accomplished by a number of copper catalysts. For example, Greene in U.S. 3,381,034 reacted various nitriles with water in the presence of soluble copper ions. The present invention is distinguished over this art because the catalysts of the invention contain catalytic copper metal. In contrast, Greene used massive copper metal to make her catalysts and stated that this metal was not catalytic.

Watanabe in Bull. Chem. Soc. Japan, 32, 1280 (1959); 37, 1325 (1964); and 39, 8 (1966) shows the use of reduced copper chloride, a catalyst useful in the present invention. His catalysts were prepared by contacting copper chloride with zinc and were employed only to convert benzonitrile to benzamide. In contrast, the present invention converts aliphatic nitriles to the corresponding amide. Watanabe in Bull. Chem. Soc. Japan, 37, in the left column of p. 1325 makes the broad statement that "[the] reaction of aliphatic nitriles is somewhat complicated and is different from that of aromatic ones: the yield of the amides is comparatively lower than that from aromatic nitriles, and the hydration reaction is accompanied by side reactions forming some acidic compounds." Although this general statement is apparently based on work done with nickel catalysts, it would be expected that similar results would be obtained with copper compounds. Contrary to this expected result, it has been found that for catalysts which contain catalytic copper, the reaction forms little or no by-products.

SUMMARY OF THE INVENTION

It has now been discovered according to the present invention that aliphatic nitriles are hydrated to the corresponding amide by contacting the nitrile in the presence of water with a cupreous catalyst containing a catalytic amount of copper.

The central aspect of the present invention is that copper metal is catalytic in the conversion of aliphatic nitriles to the corresponding amides and that such reactions give little or no by-products. As noted in our previous application, this catalytic copper may take essentially any form so long as it catalyzes the conversion of the nitrile.

Our previous applications show various methods of obtaining catalytic copper. For example, our prior applications Ser. No. 835,765, filed June 23, 1969, and Ser. No. 157,647, filed June 28, 1971, show methods of obtaining catalytic copper by reducing copper oxide to copper metal. Our prior applications, Ser. No. 835,765, filed June 23, 1969, and Ser. No. 157,648, filed June 28, 1971, show that active copper catalysts are conveniently prepared by reducing copper hydroxide or a copper salt to copper metal using a suitable reducing agent. Thus, in our prior applications we have shown that copper metal catalysts which have practical activity in the conversion of nitriles to amides can be prepared.

From these data and disclosures, it would be well known to one of ordinary skill that there are numerous equivalent methods of preparing an active copper catalyst. This is true because of the attributes of the copper catalysts prepared by the methods above are known. A prime attribute of these practical catalysts is high surface area. Catalysts having a surface area of greater than 0.2 square meter per gram are preferred, with those catalysts having a surface area of at least about 0.5 square meters per gram being of special interest because of their high activity and the desirable reaction obtained. Thus, methods of preparing catalysts of high surface area would be known to be applicable to these copper catalysts described.

Many active copper catalysts are available commercially. For example, in our prior applications, a large number of copper containing catalysts were purchased commercially and then treated, normally by reduction, to obtain an active copper catalyst. Also available at the time of our prior applications were other commercial preparations that could be transformed into active copper metal catalysts having high surface area. For example, alloys of aluminum and copper were available from which could be made high surface area copper catalysts known as Raney copper. These catalysts are normally prepared by leaching out the aluminum with strong base to leave a finely divided copper metal.

In our prior application claiming copper, all of these methods of obtaining catalytic copper are covered under the generic term "copper." A prime facet of our basic discovery at that juncture was that copper and reduced copper compounds are especially active catalysts for the conversion of aliphatic nitriles to the corresponding amide without significant amounts of by-product.

To summarize and amplify on our prior work, active copper catalysts are prepared by reducing copper oxide, by reducing copper hydroxide or a copper salt and by other known techniques. These three categories are discussed in detail below.

Copper catalysts from copper oxide

In the preparation of copper catalysts from copper oxide, the copper oxide may be cupric oxide, cuprous oxide or a mixture of the two. These copper oxide starting materials are usually obtained commercially or they may be prepared by the decomposition and/or reduction of other copper compounds, such as copper hydroxide, copper carbonate, copper acetate, copper oxalate, copper nitrate and the like. Any such method of obtaining the copper oxide starting material is acceptable.

To prepare the active copper catalysts of the invention from copper oxide, the copper oxide is contacted with a reducing agent under conditions which cause the oxide to be reduced to copper metal. The most convenient method of obtaining an active catalyst is a hydrogenation using temperatures of about 100° to about 350° C. Although reduction with hydrogen is preferred, other reducing agents, such as sodium borohydride, hydrazine and aluminum hydride, are also conveniently employed.

Copper catalysts prepared from copper hydroxide or a copper salt

The copper catalysts of the invention prepared from copper hydroxide or a copper salt are prepared in much the same manner as shown for the preparation of copper catalysts from copper oxide. Some of the copper salts, however, require more strenuous conditions of reduction to obtain a desirable copper metal catalyst.

Representative examples of copper salts that can be reduced to copper to give a desirable catalyst include: copper salts having nitrogen-containing anions, such as copper nitrate, copper nitrite, copper nitride, copper cyanide, copper nitroprusside and copper ferrocyanide; copper salts having halogen-containing anions, such as copper chloride, copper bromide, copper perchlorate, copper bromate and copper iodide; copper salts having sulfur-containing anions, such as copper sulfide, copper sulfate, copper sulfite and copper thiocyanate; copper salts having organic carboxylic acid-containing anions, such as copper carbonate, copper acetate, copper oxalate, copper butyrate, copper citrate, copper formate, copper benzoate and copper laurate; and other copper salts, such as copper borate, copper phosphate, copper carbide, copper chromate and copper tungstate.

Preferred catalysts are obtained by reducing copper hydroxide or copper salts having anions containing nitrogen, sulfur or organic carboxylic acids, with copper nitrate, copper acetate, copper carbonate, copper oxalate, copper sulfide, copper chloride and copper hydroxide being of special interest.

In the reduction of copper hydroxide or a copper salt to produce a copper catalyst, the interrelationship of temperature, time, and nature and amount of reducing agent determines the extent of the reduction. For example, in a preferred hydrogen reduction, the temperature may range from about 50° to about 500° C. or more, with temperatures of about 150° to about 350° C. being preferred. Unnecessarily high temperatures have a tendency to reduce the activity of the resulting catalysts. The time and quantity are preferably adjusted to give essentially complete reduction to catalytic copper metal.

Although reduction of the copper salt with hydrogen to produce a copper catalyst is convenient, other reducing agents may also be employed. For example, the catalyst may be prepared by contacting the salt under the appropriate conditions with hydrazine, carbon, carbon monoxide, $NH_2OH$, $NaBH_4$, $Na_2S_2O_4$, a lower alkane or a lower alkanol or other reducing agent. Preferred liquid phase reducing agents are $NaBH_4$ and hydrazine.

As examples of reductions of the invention, copper catalysts are prepared by contacting under aqueous conditions a soluble copper salt, such as $CuCl_2$, $CuBr_2$, $Cu(NO_3)_2$, $Cu(ClO_3)_2$, copper oxalate, copper formate, copper acetate, $Cu(NH_3)_4S_2O_6$, $Cu(NH_3)_4CrO_4$ or $Cu(OH)_2$ with a reducing agent such as $NH_2OH$, $NaBH_4$, $N_2H_4$, $Na_2S_2O_4$ or an active metal such as zinc. Also, under anhydrous conditions, copper hydroxide or any copper salt, such as $CuC_2$, $Cu(ClO_3)_2$, $CuCrO_4$, copper formate, copper acetate, $CuCl_2$, $CuBr_2$, $Cu(NO_3)_2$, $CuC_2O_4$, copper stearate, copper tartrate, CuS, $$Cu(NH_3)_4CrO_4$$

or $Cu(NH_3)_4S_2O_6$ are reduced by contact with a reducing agent, such as hydrogen. The optimum conditions for such reductions vary widely as different salts and reducing agents are employed.

Other preparations of copper catalysts

As noted above, the thrust of the present invention is the discovery that copper metal is an active catalyst that can convert aliphatic nitriles to the corresponding amide with little or no by-products. From this discovery, the specific manner of preparing the catalyst is relatively straightforward.

One of the most notable of the methods of preparing a catalyst with a high surface area is to use the Raney technique which is normally associated with preparing Raney nickel. Raney copper can be prepared by similar techniques. Commercial formulations which can be used to prepare these catalysts are readily available, for example, an alloy of aluminum and copper is available from W. R. Grace and Co. Such catalysts are developed or activated by known techniques to give the active copper catalysts of the invention. Normally such techniques involve contacting the alloy with a strong base under conditions which leach out the aluminum.

In addition to the use of copper metal as Raney copper, other copper catalysts can be devised. For example, a piece of copper metal, which Greene et al. have shown is noncatalytic, is made catalytic by heating the metal in air and then contacting it with a reducing agent. Also, active catalysts may be prepared by grinding copper metal to a very fine powder. Moreover, other techniques are now known or can be conceived which can be used to prepare the active copper catalysts of the invention.

In summary, numerous techniques can be used to prepare copper catalysts which convert nitriles to the corresponding amide with little or no by-products.

The precise point of the present invention is the use of these active copper metal catalysts in the hydration of aliphatic nitriles. The process parameters in the catalytic hydrolysis are broadly known. Nonetheless, their clarification and explanation would be helpful to give the optimum benefit from the invention.

Of course, the copper catalysts of the invention may be used alone or in combination with other materials. For example, the copper metal catalyst may be mounted on an inert support, it may be used in combination with other inert materials or it may be used in combination with other materials that are catalytic in the process. The important aspect of the invention, however, is that the catalyst contains catalytic copper.

An important factor in the use of the copper catalyst is the liability of the catalyst to deactivation upon exposure to oxygen. This contact is usually encountered after the active catalyst is prepared by contact with the atmosphere or by contact with feed solutions which contain dissolved oxygen. Thus, in the preferred practice of the process, this deleterious contact with oxygen prior to or during the hydration is avoided. Such precautions are taken by protecting the catalyst from contact with an oxygen-containing gas after activation and by removing substantially all of the dissolved oxygen from the feed stream of nitrile and water.

Any aliphatic nitrile may suitably be used in the present invention, with hydrocarbon nitriles containing up to about 20 or more carbon atoms being preferred. Representative examples of suitable nitriles include: saturated aliphatic hydrocarbon nitriles such as acetonitrile, propionitrile, pentanonitrile, dodecanonitrile, succinonitrile, adiponitrile and the like; and unsaturated aliphatic hydrocarbon nitriles such as acrylonitrile, methacrylonitrile, crotonic nitrile, β-phenylacrylonitrile, 2-cyano-2-butene, 1-cyano-1-octene, 10-undecenonitrile, maleonitrile, fumaronitrile. Of the nitriles suitable for use in the invention, the olefinic nitriles of 3 to 6 carbon atoms are especially preferred, with the conversion of acrylonitrile to acrylamide being of special interest.

The proportions of nitrile to water in the reactant mixture may vary widely because any amount of water that gives the hydration is acceptable. More important than the specific nitrile to water ratio is the extent of the interaction between the nitrile and water. A high degree of contact is desirable to assure the greatest efficiency in the reaction. For gaseous reactants, the nitrile and water are miscible in all proportions, but for liquid reactants, certain precautions may be helpful to insure that intimate contact of the nitrile and water is maintained. The necessary contact may be realized by dissolving the nitrile in the water or by dissolving the water in the nitrile. Outside of the limits of the solubility of one of the reactants in the other, however, the reactant mixture may be agitated, a suitable solvent may be added or another means of increasing the contact of the reactants may be employed. Excess water is the preferred solvent although other inert solvents, such as alkanols, dioxane, dimethyl sulfoxide, acetone, dimethyl ether of ethylene glycol or tetrahydrofuran, may also be used.

The copper metal catalysts of the invention are convenient to use in both a batch process and a continuous flow process. Using either method, the nitrile and water are contacted with the catalyst under the appropriate reaction conditions, and the amide product is then recovered. Since the catalysts of the present invention are normally employed as essentially insoluble heterogeneous catalysts, a continuous flow reaction is preferred. For catalysts which are powders, a countercurrent flow reactor might be preferred.

In a continuous flow reaction using a fixed bed reactor, the solid catalyst of the invention is packed into a reaction chamber having an inlet for reactants and an outlet for products. The reaction chamber is maintained at the desired reaction temperature and the rate of flow of reactants over the catalyst is controlled to give the desired contact of the reactants with the catalyst. The reactants may be fed over the solid catalyst as a gas or, preferably, as a liquid. The reaction product from the reactor may be used as such or purified by any known technique.

The temperature of the reaction may vary widely as different nitriles are used in the invention. Generally, the reaction is conducted within a temperature range of about 0° to about 400° C. At temperatures below this level, the reaction is impractically slow. Above this range, the reaction forms an increasing amount of undesirable by-products. Within the broad temperatures range and when operating in the liquid phase, temperatures of about 25° to about 200° C. are preferred. For unsaturated nitriles which tend to polymerize, a reaction temperature of less than about 200° C., the use of polymerization inhibitors or dilute reaction solutions are desirable to avoid polymerization of the nitrile and possible poisoning of the catalyst.

The other reaction conditions are known in the art of using heterogeneous catalysts and are not critical in the invention. The important aspect of the invention is the use of the cupreous catalyst containing copper to convert nitriles to the corresponding amides.

SPECIFIC EMBODIMENTS

Example 1.—Use of a copper catalyst prepared by reducing copper oxide

A copper catalyst was prepared by reducing 20 grams of a catalyst containing 99% CuO sold under the trade name Harshaw Cu0307. The reduction was conducted at 250° C. for 4 hours using a gaseous stream containing 130 cc./min. of $H_2$ and 510 cc./min. of $N_2$. A 15 cc. reactor was packed with 19 g. of the activated catalyst, and the reactor was held at 80° C. The reactor was run continuously using a 14 cc./hr. flow of 7% acrylonitrile in water. Over two weeks of continuous operation, the conversion of acrylonitrile decreased from 75% to 33%, the yield of acrylamide was essentially constant at 91% and the yield of β-hydroxypropionitrile decreased from 3 to 1%. Oxygen was not excluded from the feed stream.

Examples 2–6 and Comparative Example A.—Copper prepared by the reduction of copper oxide with $NaBH_4$ Copper oxide pellets sold under the trade name Harshaw CuXL 112A–17–8–2 and measuring ⅛″ x ⅛″ were reduced with an aqueous solution of $NaBH_4$. About 8 g. of copper oxide pellets and 200 cc. of a solution of $NaBH_4$ were contacted for a period of one hour with agitation. The $NaBH_4$ concentration, pH and temperature of the reduction are shown in Table I along with a catalyst washed with only water for comparison. The $NaBH_4$ is basic in water; the acid pH were obtained by adding concentrated HCl to the $NaBH_4$ solution. The catalysts were tested by charging one gram of the pellets into a glass ampoule along with 5 cc. of a 7% aqueous solution of acrylonitrile. The acrylonitrile was reacted in the presence of the catalyst for one hour at 100° C. The results of these experiments are shown in Table I. No β-hydroxypropionitrile or other by-products were found.

TABLE I

Hydration of acrylonitrile using catalysts prepared by reducing copper oxide with $NaBH_4$

| Example | Copper oxide reduction | | | Hydration, percent | |
|---|---|---|---|---|---|
| | $NaBH_4$, molar | pH | Temp., °C. | Conv. | Yield |
| Comparison A | 0 | Neutral | 25 | 24 | 57 |
| 2 | 0.25 | Basic | 25 | 78 | 84 |
| 3 | 0.50 | do | 25 | 89 | 83 |
| 4 | 0.50 | Acid | 25 | 68 | 86 |
| 5 | 0.50 | Basic | 90 | 83 | 93 |
| 6 | 0.50 | Acid | 90 | 53 | 70 |

Examples 7–17.—Copper prepared by reducing copper salts with hydrogen

A number of copper catalysts were prepared by heating about 20 g. of a copper salt in a 640 cc./min. flow of a gaseous hydrogen stream containing 20% hydrogen in nitrogen for 4 hours. The catalysts were tested for catalytic activity by loading one gram of the catalyst in a glass ampoule and adding 5 cc. of a 7% acrylonitrile-in-water solution. The ampoule was sealed and heated to the temperature specified for one hour. After the reaction, the ampoule was cooled and the contents were analyzed by vapor phase chromatography. The results of these experiments are shown in Table II. No by-products were observed. The indicated conversions and yields are based on acrylonitrile consumed.

TABLE II

Hydration of acrylonitrile to acrylamide using copper catalysts prepared by reducing copper salts with hydrogen

| Ex. | Copper salt reduced | Reduction, temp., °C. | Hydration, percent | | | |
|---|---|---|---|---|---|---|
| | | | 80° C. | | 130° C. | |
| | | | Conv. | Yield | Conv. | Yield |
| 7 | $Cu(NO_3)_2$ | 175 | 7 | 0 | 34 | 1.1 |
| 8 | $Cu(NO_3)_2$ | 275 | 7 | 100 | 59 | 85 |
| 9 | $Cu_2C_2O_4$ | 275 | 46 | 0 | 36 | 2.7 |
| 10 | $Cu(Ac)_2$ | 275 | 21 | 21 | 48 | 38 |
| 11 | $CuCl_2$ | 300 | 38 | 0 | 38 | 0.3 |
| 12 | CuCl | 300 | 31 | 0 | 45 | 3.6 |
| 13 | CuBr | 300 | 18 | 0 | 17 | 1.4 |
| 14 | $CuSO_4$ | 300 | 3 | 0 | 4 | 3 |
| 15 | $CuCO_3$ | 175 | 74 | 97 | No Data | |
| 16 | $CuC_2O_4$ | 175 | 16 | 90 | No Data | |
| 17 | Cu-Cr carbonate | 175 | 62 | 95 | No Data | |

Examples 18–22.—Copper catalysts prepared by the reduction of copper salts with $NaBH_4$ Various copper salts were treated with 200 cc. of a 0.5 molar solution of $NaBH_4$ in water for one hour at 25° C. These catalysts were tested as shown in Examples 7-17 above, and the results are shown in Table III. No by-products were detected in the product.

TABLE III

Hydration of acrylonitrile to acrylamide using copper catalysts prepared by reducing copper salts with $NaBH_4$

| Example | Copper salt reduced | Hydration at 100° C. for 1 hr., percent | |
|---|---|---|---|
| | | Conversion | Yield |
| 18 | $Cu(NO_3)_2$ | 98.9 | 90.5 |
| 19 | $Cu(C_2H_3O_2)_2$ | 100 | 86.6 |
| 20 | $CuCrO_4$ ᵃ | 9.9 | 28.6 |
| 21 | $CuC_2O_4$ | 100 | 91.6 |
| 22 | Copper tartrate | 51.6 | 80.1 |

ᵃ 0.25 g. of catalyst employed rather than 1 g.

Example 23.—Copper catalyst prepared by the reduction of $CuCl_2$ with Zn

To prepare a Urushibara-A copper catalyst, zinc was added to an aqueous solution of cupric chloride to precipitate metallic copper. After the evolution of gas had ceased, the product was leached with acetic acid to form the desired catalyst. Using the same procedure as shown in Example 7, 0.51 g. of the catalyst was used to hydrate acrylonitrile to acrylamide at 75° C. for one hour. The conversion of the nitrile was 16% with a 55.2% yield of the amide. No by-products were observed.

Example 24.—Copper catalyst prepared by the reduction of copper nitrate with hydrazine Copper nitrate was reduced to copper metal by contacting 0.1 mole of $Cu(NO_3)_2$ in 100 cc. of water with 200 cc. of 0.1 molar aqueous hydrazine over a one hour period at 25° C. One gram of the copper catalyst prepared was reacted with 5 cc. of a 7% aqueous acrylonitrile solution at 100° C. for one hour. The acrylonitrile was 11.2% converted to give a 9.8% yield of acrylamide.

Example 25.—Copper prepared by reducing copper oxide on a copper support

A catalyst was prepared by heating 8.2 g. of 100 mesh copper screen in air at 300° C. for 10 hours and then reducing the screen with hydrogen as described above at a temperature of 175° C. To a bomb reactor was added 5.99 g. of the reduced screen, 5.1 g. of water and 0.374 g. of acrylonitrile. The reactor was sealed and heated at 100° C. for 65 minutes. After the reaction, the contents were analyzed to find that 6.3% of the acrylonitrile had been converted and of the acrylonitrile converted 97.8% was acrylamide. No by-products were found.

Example 26.—Conversion of massive copper metal to an active metal catalyst

In a manner similar to Example 25, a porous cylindrical copper plug measuring ⅝" in diameter x 4" and sold by the Hyuck Corporation was used as a catalyst for the conversion of acrylonitrile to acrylamide. The reaction was conducted in a continuous manner by passing a 7% solution of acrylonitrile in water over the catalyst at a rate of 14 cc./hr. and at a temperature of 80° C. Without oxidation and reduction, the acrylonitrile was 7% converted and no acrylamide was detected in the product. Upon oxidation of the copper plug at 300° C. and reduction with hydrogen at 175° C., the acrylonitrile was about 20% converted and the yield of acrylamide was 50%.

Example 27.—Use of fine copper powder as a catalyst

The catalyst was a —325 mesh copper metal sold by Baker and Adamson Chemicals Co. under the Code 1618 and having a surface area of 0.5 square meter per gram. One gram of the copper metal catalyst was placed in a reactor with 5 cc. of a 7% solution of acrylonitrile in water. The reactor was heated at 120° C. for 1 hour to convert 12.2% of the acrylonitrile. The yield of acrylamide was 13.3%, and no β-hydroxypropionitrile was found in the product. The same copper powder reduced with hydrogen gave a 13.1% conversion of acrylonitrile and a 28.4% yield of acrylamide with no β-hydroxypropionitrile.

Example 28.—Preparation of acrylamide from commercially available Raney copper

Activated Raney copper sold by the W. R. Grace Company as Grade 29 and having a surface area of 14.3 square meters per gram was employed as the catalyst in the hydration of acrylonitrile to acrylamide. To a reactor was charged 0.25 g. (dry weight) of the wet activated Raney copper catalyst and 5 cc. of 7% acrylonitrile in water. The temperature of the reactor was maintained at 80° C. for one hour. Analysis of the reactor contents after reaction indicated that 33.7% of the acrylonitrile had been converted and that a 39.4% yiel dof acrylamide was produced. No β-hydroxypropionitrile was observed in the product.

Example 29.—Use of commercial Raney copper as a catalyst

In the same manner as described in Example 28, 0.14 g. dry weight of Grace Grade 29 Raney copper was employed to convert acrylonitrile to acrylamide. The conversion of acrylonitrile was 31.9%, and the yield of acrylamide was 39.5%. No β-hydroxypropionitrile was found in the product.

In the same manner as described above, other copper salts are reduced to obtain desirable copper catalyst. For example, a solution of cupric nitrate is reduced with metallic zinc to give a desirable copper catalyst that is employed in the conversion of acrylonitrile to acrylamide, methacrylonitrile to methacrylamide or pentanonitrile to pentanoamide.

We claim:
1. In the process for converting an aliphatic nitrile to the corresponding amide by reacting the nitrile with water in the presence of a heterogeneous catalyst, the improvement comprising: using a catalytic amount of a catalyst consisting essentially of copper metal.
2. The process of claim 1 wherein the nitrile is an olefinic nitrile of 3 to 6 carbon atoms.
3. The process of claim 1 wherein the nitrile is acrylonitrile.
4. The process of claim 1 wherein the catalyst is protected from contact with oxygen prior to or during the hydration.
5. The process of claim 1 wherein the reaction is run in the liquid phase.
6. The process of claim 1 wherein the temperature is about 25° to about 200° C.
7. The process of claim 1 wherein the catalyst has a surface area of at least about 0.2 square meter per gram.
8. The process of claim 3 wherein the catalyst has a surface area of at least about 0.5 square meter per gram.
9. The process of claim 8 wherein the reaction is run in the liquid phase at a temperature of about 25° to 200° C.

References Cited

UNITED STATES PATENTS 3,631,104  12/1971  Habermann et al. __ 260—561 N
3,642,894  2/1972   Habermann et al. __ 260—561 N LEWIS GOTTS, Primary Examiner E. G. LOVE, Assistant Examiner

260—404, 558 R, 561 R

PO-1050
(5/69)

UNITED STATES PATENT OFFICE
CERTIFICATE OF CORRECTION

Patent No. 3,767,706      Dated October 23, 1973

Inventor(s) Clarence E. Habermann and Ben A. Tefertiller

It is certified that error appears in the above-identified patent and that said Letters Patent are hereby corrected as shown below:

Column 2, line 32 after "because" delete "of"

Column 6, line 65, in Example 12 under the heading "80° Conv.", delete "31" and insert --41--.

Column 8, line 19, delete "yiel dof" and insert --yield of--.

Signed and sealed this 29th day of October 1974.

(SEAL)
Attest:

McCOY M. GIBSON JR.
Attesting Officer

C. MARSHALL DANN
Commissioner of Patents

Disclaimer 3,767,706.—*Clarence E. Habermann* and *Ben A. Tefertiller*, Midland, Mich. HYDRATION OF ALIPHATIC NITRILES TO AMIDES USING COPPER METAL CATALYSTS. Patent dated Oct. 23, 1973. Disclaimer filed Mar. 21, 1975, by the assignee, *The Dow Chemical Company*.

Hereby enters this disclaimer to claims 1, 2, 3, 5, 6, 7, 8, and 9 of said patent.

[*Official Gazette July 15, 1975.*]

UNITED STATES PATENT AND TRADEMARK OFFICE
Certificate
Patent No. 3,767,706　　　　　　　　　　　　Patented October 23, 1973

Clarence E. Habermann and Ben A. Tefertiller

Application having been made by Clarence E. Habermann and Ben A. Tefertiller, the inventors named in the patent above identified, for the issuance of a certificate under the provisions of Title 35, Section 256, of the United States Code, adding the name of Ralph E. Friedrich as a joint inventor, and a showing and proof of facts satisfying the requirements of the said section having been submitted, it is this 4th day of November 1980, certified that the name of the said Ralph E. Friedrich is hereby added to the said patent as a joint inventor with the said Clarence E. Habermann and Ben A. Tefertiller.

FRED W. SHERLING,
*Associate Solicitor.*